US012081448B2

(12) United States Patent
Fruchter et al.

(10) Patent No.: US 12,081,448 B2
(45) Date of Patent: Sep. 3, 2024

(54) REDUCING DECODE DELAY AT A CLIENT DEVICE

(71) Applicant: Synamedia Limited, Staines Upon Thames (GB)

(72) Inventors: Avi Fruchter, Neve Daniel (IL); Ilan Cohen, Herzliya (IL); Zorach Reuven Wachtfogel, Elazar (IL); Uziel Joseph Harband, Jerusalem (IL); Einav Rivni, Beit-Shemesh (IL); Thomas Paul Burnley, Hampshire (GB)

(73) Assignee: Synamedia Limited, Maidenhead (GB)

( * ) Notice: Subject to any disclaimer, the term of this patent is extended or adjusted under 35 U.S.C. 154(b) by 152 days.

(21) Appl. No.: 17/360,126

(22) Filed: Jun. 28, 2021

(65) Prior Publication Data
US 2022/0417164 A1 Dec. 29, 2022

(51) Int. Cl.
*H04L 47/30* (2022.01)
*H04L 43/16* (2022.01)
*H04L 65/61* (2022.01)

(52) U.S. Cl.
CPC .............. *H04L 47/30* (2013.01); *H04L 43/16* (2013.01); *H04L 65/61* (2022.05)

(58) Field of Classification Search
CPC .......... H04L 47/30; H04L 65/61; H04L 43/16
See application file for complete search history.

(56) References Cited

U.S. PATENT DOCUMENTS

| 7,716,358 | B2 | 5/2010 | Price |
| 9,432,435 | B2 | 8/2016 | Krikorian et al. |
| 10,645,448 | B2 | 5/2020 | Wu et al. |
| 2006/0230176 | A1 | 10/2006 | Dacosta |
| 2007/0011343 | A1 | 1/2007 | Davis et al. |
| 2012/0271920 | A1* | 10/2012 | Isaksson ............ H04N 21/2393 709/219 |
| 2015/0032851 | A1* | 1/2015 | Lieber ................... H04L 65/762 709/219 |
| 2019/0373032 | A1* | 12/2019 | Kumar ..................... H04L 47/25 |
| 2020/0259880 | A1* | 8/2020 | Xiong .................... H04N 7/185 |

* cited by examiner

*Primary Examiner* — Emmanuel L Moise
*Assistant Examiner* — Xiang Yu
(74) *Attorney, Agent, or Firm* — Fernando & Partners, LLP

(57) ABSTRACT

Various implementations disclosed herein include devices, systems, and methods for reducing a decode delay at a client device. In some implementations, a device includes one or more processors and a non-transitory memory. In some implementations, a method includes determining that a client device is being switched from a real-time content presentation mode in which the client device presents real-time content to a buffered content presentation mode in which the client device presents buffered content. In some implementations, the method includes transmitting, to the client device, video frames corresponding to the buffered content at a first transmission rate. In some implementations, the method includes changing the first transmission rate to a second transmission rate based on an indication that a number of bits stored in a buffer of the client device satisfies a decode threshold.

20 Claims, 9 Drawing Sheets

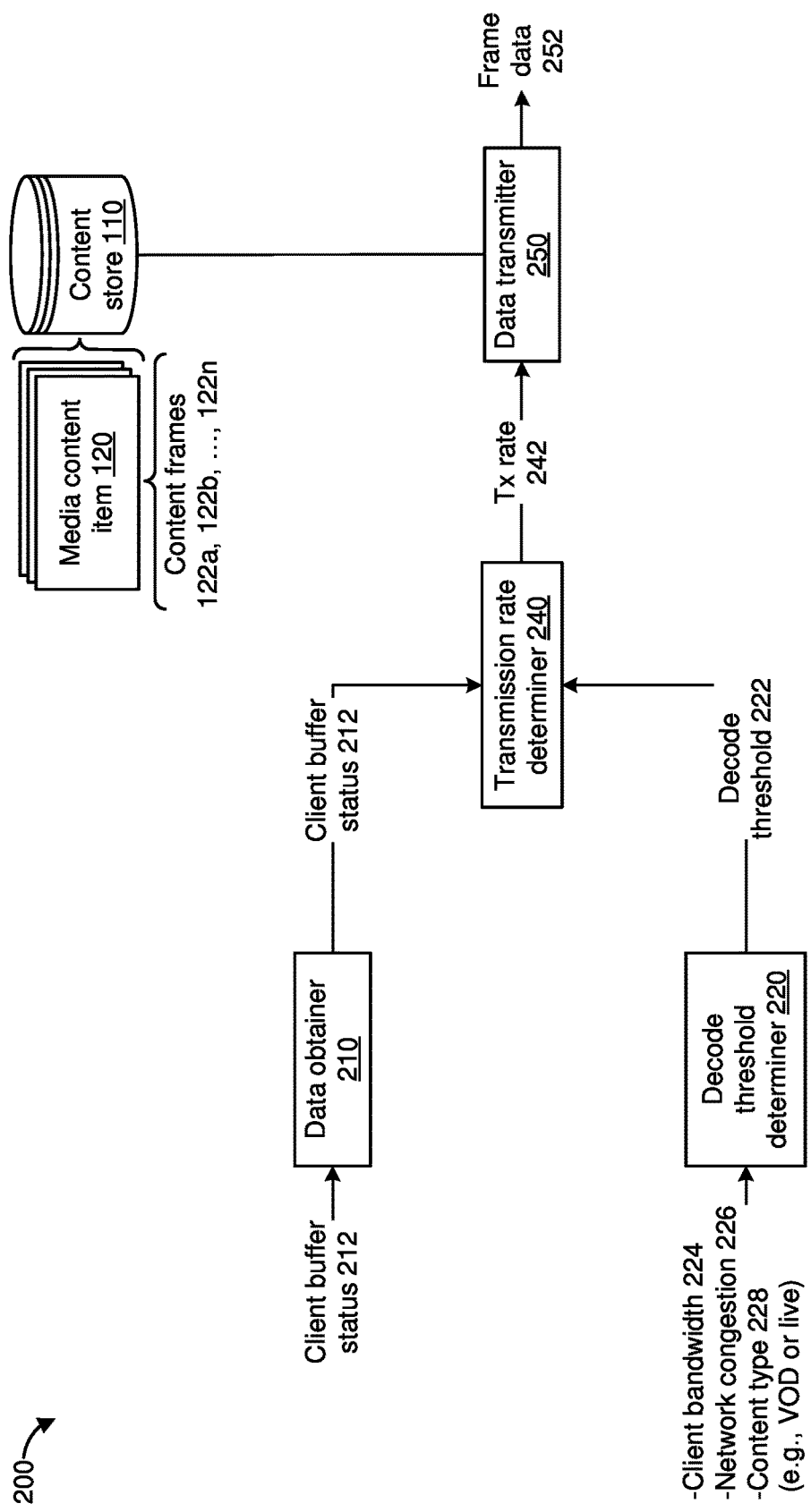

REDUCING DECODE DELAY AT A CLIENT DEVICE

TECHNICAL FIELD

The present disclosure generally relates to reducing decode delay at a client device.

BACKGROUND

Some devices are capable of presenting content that includes video content. When a device receives a command to present video frames from a buffer, the device may need to wait for the buffer to accumulate a sufficient number of video frames.

BRIEF DESCRIPTION OF THE DRAWINGS

So that the present disclosure can be understood by those of ordinary skill in the art, a more detailed description may be had by reference to aspects of some illustrative implementations, some of which are shown in the accompanying drawings.

FIG. 2 is a block diagram of a system in accordance with some implementations.

Figure 1A:
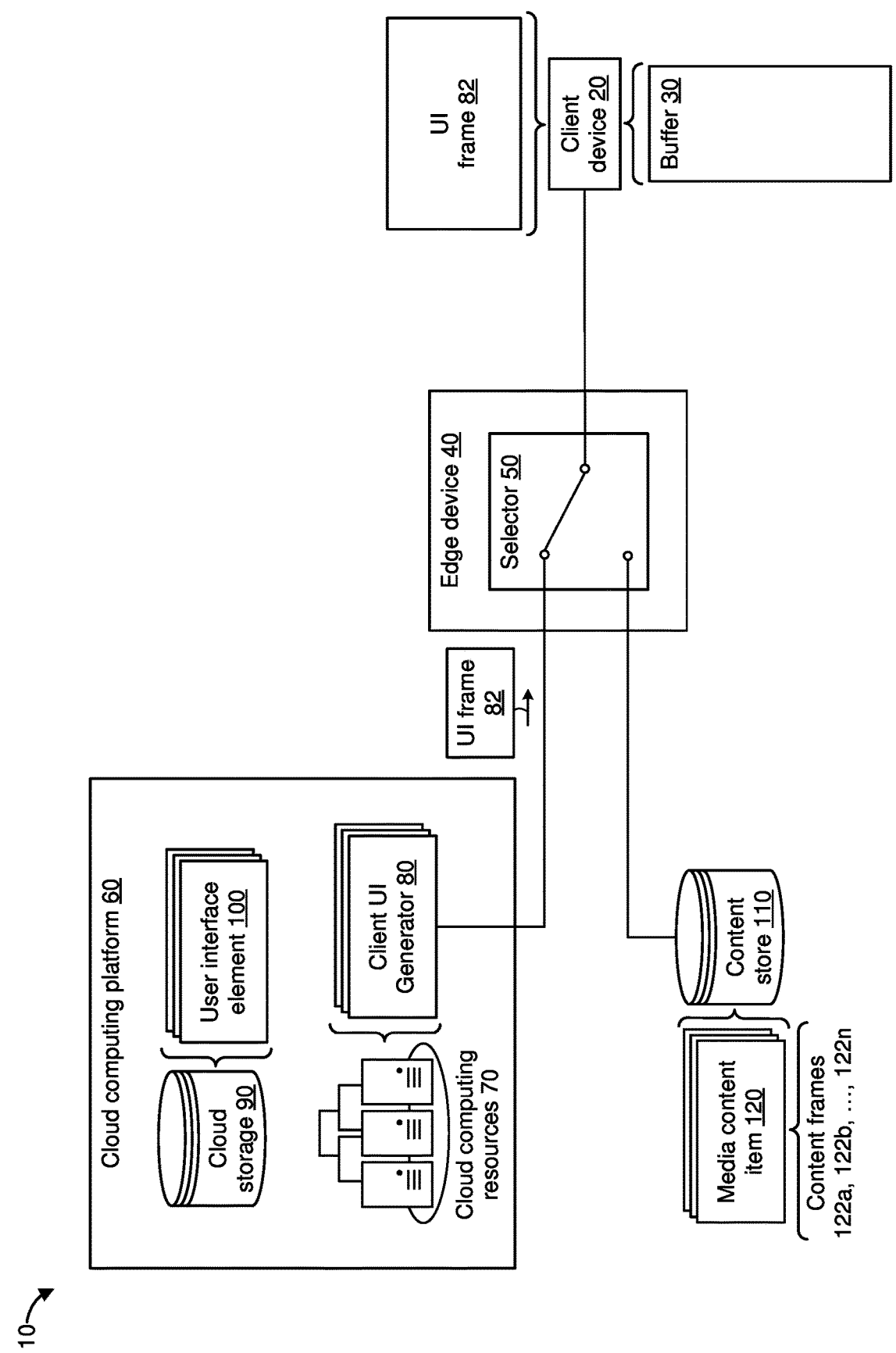
FIGS. 1A-1F are diagrams of an example operating environment in accordance with some implementations.

In accordance with common practice the various features illustrated in the drawings may not be drawn to scale. Accordingly, the dimensions of the various features may be arbitrarily expanded or reduced for clarity. In addition, some of the drawings may not depict all of the components of a given system, method or device. Finally, like reference numerals may be used to denote like features throughout the specification and figures.

DESCRIPTION OF EXAMPLE EMBODIMENTS

Numerous details are described in order to provide a thorough understanding of the example implementations shown in the drawings. However, the drawings merely show some example aspects of the present disclosure and are therefore not to be considered limiting. Those of ordinary skill in the art will appreciate that other effective aspects and/or variants do not include all of the specific details described herein. Moreover, well-known systems, methods, components, devices and circuits have not been described in exhaustive detail so as not to obscure more pertinent aspects of the example implementations described herein.

OVERVIEW

Various implementations disclosed herein include devices, systems, and methods for reducing a decode delay at a client device. In some implementations, a device includes one or more processors and a non-transitory memory. In some implementations, a method includes determining that a client device is being switched from a real-time content presentation mode in which the client device presents real-time content to a buffered content presentation mode in which the client device presents buffered content. In some implementations, the method includes transmitting, to the client device, video frames corresponding to the buffered content at a first transmission rate. In some implementations, the method includes changing the first transmission rate to a second transmission rate based on an indication that a number of bits stored in a buffer of the client device satisfies a decode threshold.

In accordance with some implementations, a device includes one or more processors, a non-transitory memory, and one or more programs. In some implementations, the one or more programs are stored in the non-transitory memory and are executed by the one or more processors. In some implementations, the one or more programs include instructions for performing or causing performance of any of the methods described herein. In accordance with some implementations, a non-transitory computer readable storage medium has stored therein instructions that, when executed by one or more processors of a device, cause the device to perform or cause performance of any of the methods described herein. In accordance with some implementations, a device includes one or more processors, a non-transitory memory, and means for performing or causing performance of any of the methods described herein.

EXAMPLE EMBODIMENTS

A client device may need a certain number of bits before the client device can start decoding video content. Until a buffer of the client device stores the required number of bits, the client device may not be able to decode video content. For example, a decoder in the client device cannot decode a frame until the client device has received an entirety of the frame. This is referred to as a decode delay, a time delay or a byte delay. Decode delay can result in stalled video, especially when there is a delay in delivering frames to the client device. The present disclosure provides methods, systems and/or devices for reducing the decode delay at the client device. When the client device is switched from a real-time content presentation mode to a buffered content presentation mode, video frames are transmitted to the client device at a higher transmission rate until a buffer of the client device stores enough bits to start decoding the buffered content. When the buffer stores enough bits to start decoding the buffered content, the transmission rate can be lowered. Using a higher transmission rate at the beginning reduces the decode delay because the client device has to wait for a shorter time duration for the required number of bits to start the decoding process. Reducing the decode delay prevents stalled video when the client device is transitioning from the real-time content presentation mode to the buffered content presentation mode. Reducing stalled video enhances a user experience of the client device.

FIG. 1A is a diagram that illustrates an example operating environment 10 in accordance with some implementations. While pertinent features are shown, those of ordinary skill in the art will appreciate from the present disclosure that various other features have not been illustrated for the sake of brevity and so as not to obscure more pertinent aspects of the example implementations disclosed herein. To that end, as a non-limiting example, the operating environment 10 includes a client device 20, an edge device 40, a cloud computing platform 60 and a content store 110. In some implementations, the edge device 40 is a part of an edge computing network (not shown).

In various implementations, the content store 110 stores a set of one or more media content items 120. In some implementations, a media content item 120 (e.g., each of the media content items 120) includes a set of content frames (e.g., a first content frame 122a, a second content frame 122b, . . . , and an nth content frame 122n). Although the content store 110 is shown as being separate from the edge device 40 and the cloud computing platform 60, in some implementations, the content store 110 is integrated into the edge device 40 and/or the cloud computing platform 60. In some implementations, the content store 110 includes a distributed storage system.

In some implementations, the client device 20 is coupled with a display. For example, in some implementations, the client device 20 includes a dongle that is connected to a television. Alternatively, in some implementations, the client device 20 is integrated into a display (e.g., a television). As shown in FIG. 1A, the client device 20 includes a buffer 30.

The client device 20 can present content in a buffered content presentation mode or a real-time content presentation mode. When the client device 20 is presenting content in the buffered content presentation mode, the client device 20 receives content frames from the edge device 40, and the client device 20 stores the received content frames in the buffer 30 until it is time to present the content frames. By contrast, when the client device 20 is presenting content in a real-time content presentation mode, the client device 20 receives a video frame from the edge device 40 and/or the cloud computing platform 60, and the client device 20 presents the received video frame as soon as the video frame has been fully downloaded.

In some implementations, the edge device 40 includes a selector 50 that selects a content presentation mode for the client device 20. In some implementations, the selector 50 selects between the buffered content presentation mode and the real-time content presentation mode for the client device 20. In the buffered content presentation mode, the selector 50 forwards content frames from the content store 110 to the client device 20 and instructs the client device 20 to store the content frames in the buffer 30 until it is time to present the content frames. By contrast, in the real-time content presentation mode, the selector 50 forwards user interface (UI) frames (e.g., video frames that depict UI elements) from the cloud computing platform 60 to the client device 20 and instructs the client device 20 to present the UI frames immediately (e.g., without first storing the UI frames in the buffer 30). In the example of FIG. 1A, the client device 20 is in the real-time content presentation mode, and the client device 20 is presenting a UI frame 82 that was generated by the cloud computing platform 60. In some implementations, the selector 50 is referred to as a switching application that controls switching of the client device 20 between the buffered content presentation mode and the real-time content presentation mode. In some implementations, the edge device 40 implements the selector 50 by storing and executing a set of computer-readable instructions that correspond to the selector 50.

In various implementations, the cloud computing platform 60 includes cloud computing resources 70 and cloud storage resources 90 ("cloud storage 90", hereinafter for the sake of brevity). In some implementations, the cloud computing resources 70 includes server computers with numerous processors. In some implementations, the cloud computing resources 70 implement a set of one or more client UI generators 80 that generate UI frames (e.g., the UI frame 82) for client devices such as the client device 20. In some implementations, a single instance of a client UI generator 80 generates UI frames for a single client device at a given time. Alternatively, in some implementations, a single instance of a client UI generator 80 can generate UI frames for multiple client devices. In some implementations, the client UI generator 80 is referred to as a UI application. In some implementations, the cloud computing resources 70 implement an instance of the client UI generator 80 by executing a set of computer-readable instructions that correspond to the client UI generator 80.

In some implementations, the cloud storage 90 stores images 100 of user interface elements ("UI images 100" or "UI element images 100", hereinafter for the sake of brevity). In some implementations, the UI images 100 include a scrub bar image that represents a scrub bar that is displayed at the client device 20 during a scrubbing operation. In some implementations, the UI images 100 include a volume bar image that represents a volume bar that is displayed at the client device 20 during a volume adjustment operation. In some implementations, the UI images 100 include an information box image (e.g., an image of a text box that provides information regarding a media content item) that is displayed at the client device 20 during a user interface operation that corresponds to a request to display information regarding a media content item. In some implementations, the UI images 100 include a subtitle bar image that is displayed at the client device 20 in response to a user interface operation that corresponds to a request to display subtitles for a media content item. In some implementations, the UI images 100 include bitmaps.

Figure 1B:
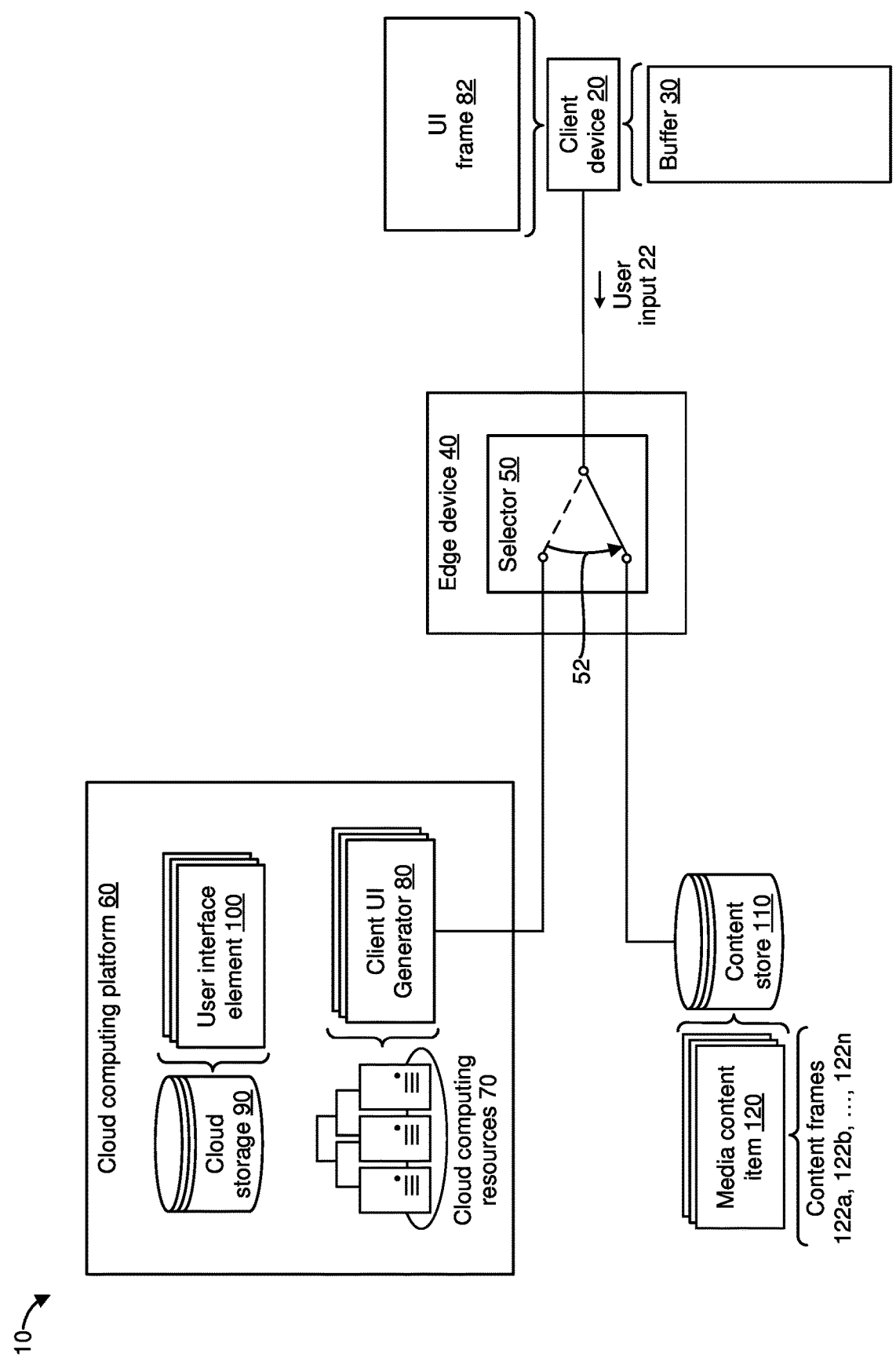

Referring to FIG. 1B, the edge device 40 (e.g., the selector 50) switches the client device 20 from the real-time content presentation mode to the buffered content presentation mode (as indicated by the arrow 52). In some implementations, the edge device 40 switches the client device 20 to the buffered content presentation mode in response to receiving a user input 22 from the client device 20. For example, if the UI frame 82 includes a list of movies and the user selects one of the movies in the list, the edge device 40 switches to the buffered content presentation mode and starts forwarding content frames for the selected movie from the content store 110 to the client device 20. In some implementations, the edge device 40 switches the client device 20 to the buffered content presentation mode in response to receiving an event notification from the client device 20 or the cloud computing platform 60. For example, the edge device 40 can switch the client device 20 to the buffered content presentation mode after the client device 20 has displayed a UI element (e.g., a banner) for a certain amount of time.

Figure 1C:
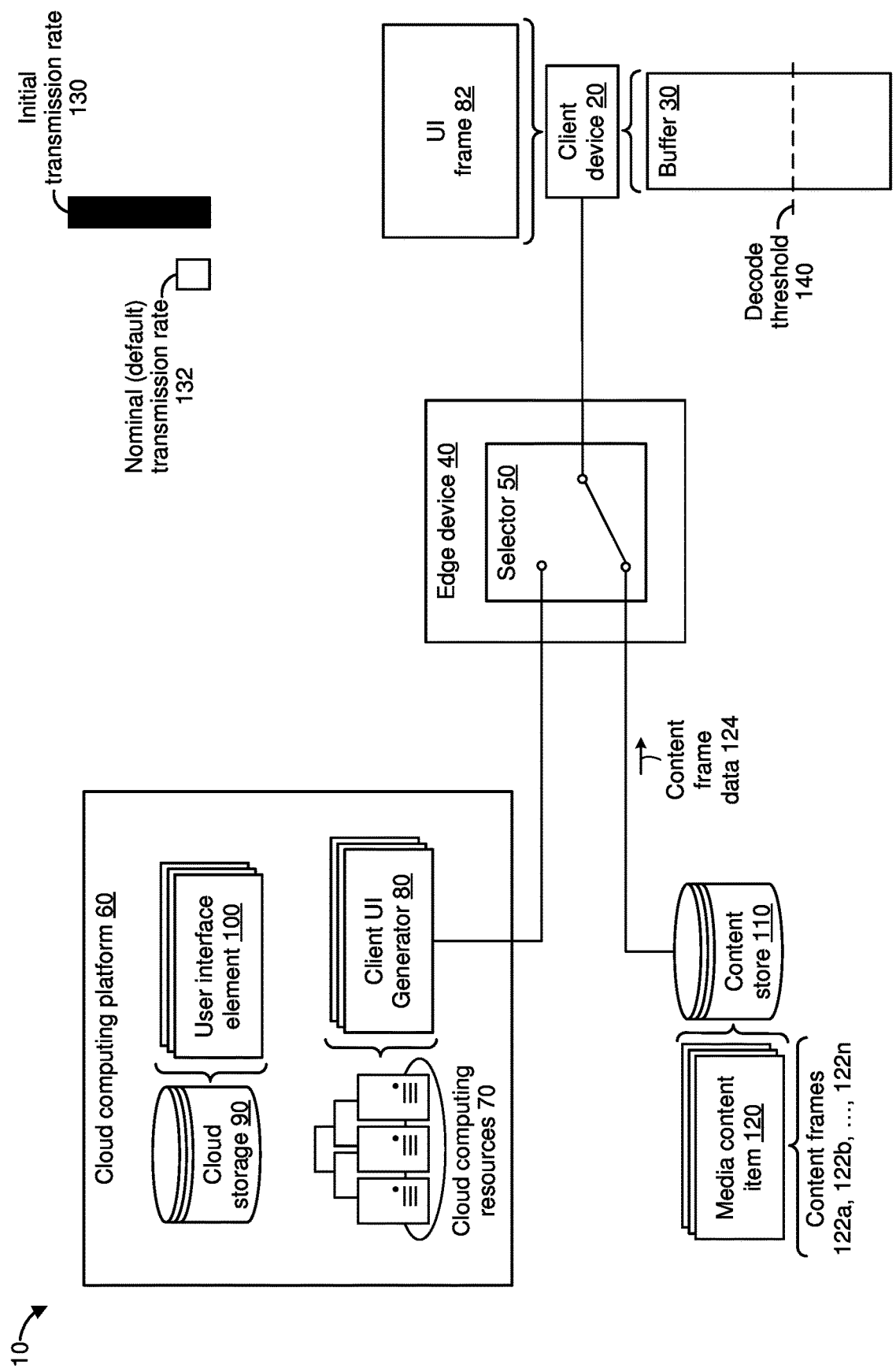

Referring to FIG. 1C, the edge device 40 retrieves content frame data 124 from the content store 110 and transmits the content frame data 124 to the client device 20. Since the client device 20 just started receiving the content frame data 124, the buffer 30 of the client device 20 is empty in FIG. 1C. The client device 20 may need a certain number of bits (e.g., a certain number of frames) to start decoding the video frames that the client device 20 is receiving from the edge device 40. The number of bits required to start decoding video frames for a content item is referred to as a decode threshold 140.

As shown in FIG. 1C, the edge device 40 transmits the content frame data 124 to the client device 20 at an initial transmission rate 130 that is greater than a nominal transmission rate 132 (e.g., a default transmission rate). The edge device 40 transmits the content frame data 124 at the initial transmission rate 130 until the buffer 30 stores enough bits to start decoding the video frames. In other words, the edge device 40 transmits the content frame data 124 at the initial transmission rate 130 until a number of bits stored in the buffer 30 is greater than the decode threshold 140. Using the initial transmission rate 130 instead of the nominal transmission rate 132 at the beginning of the buffering reduces the decode delay for the client device 20 because the client device 20 has to wait for a shorter time duration to satisfy the decode threshold 140.

Figure 1D:
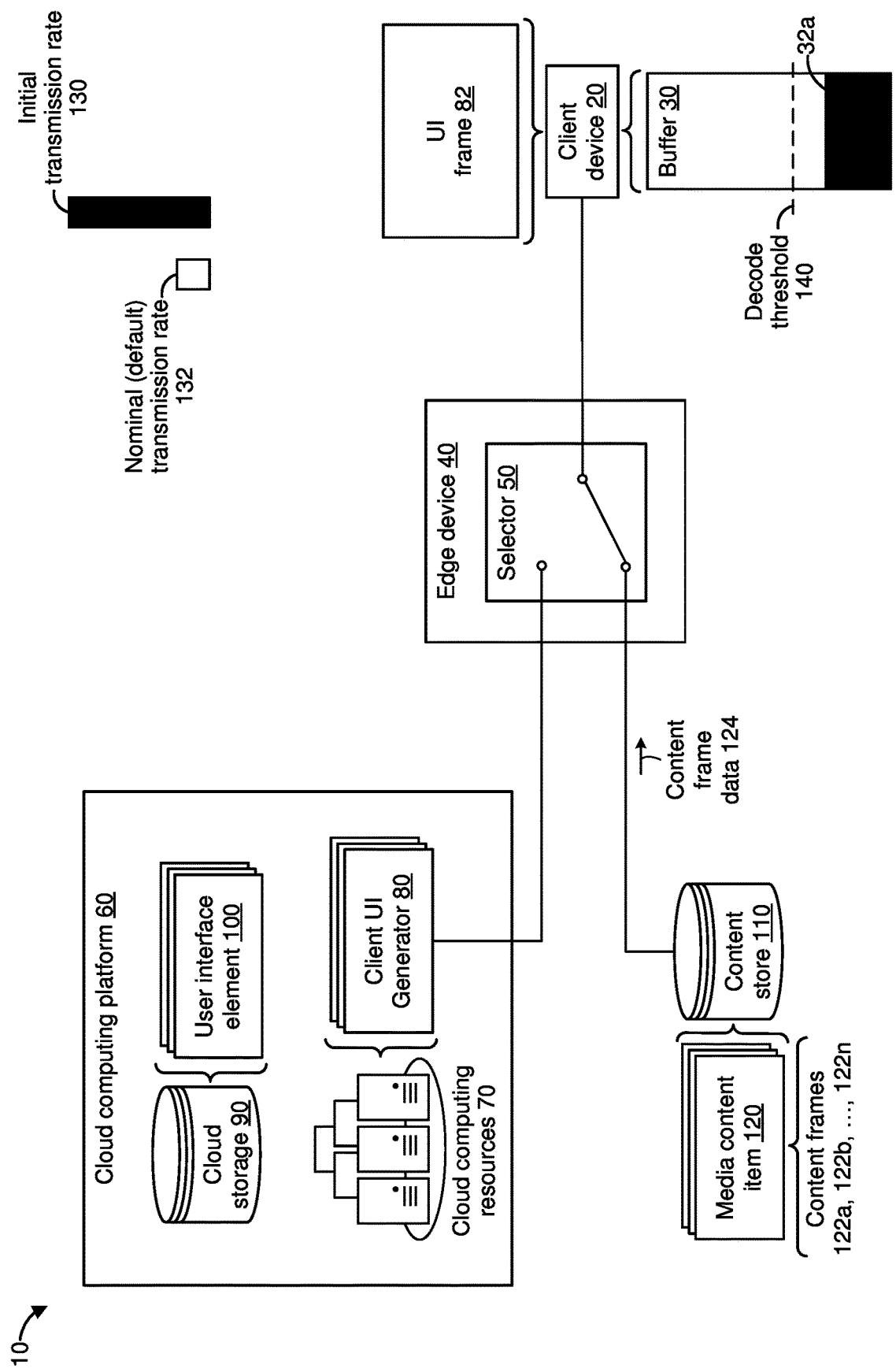

Referring to FIG. 1D, after some time of transmitting the content frame data 124 at the initial transmission rate 130, the buffer 30 stores a first number of bits 32a. However, the first number of bits 32a is still not enough to start decoding the content frame data 124 because the first number of bits 32a is less than the decode threshold 140. Because the first number of bits 32a is less than the decode threshold 140, the edge device 40 continues transmitting the content frame data 124 at the initial transmission rate 130. The content frame data 124 can include multiple video frames. As such, the initial transmission rate 130 may be used until the first few frames have been transmitted (e.g., until the first ten frames have been transmitted).

Figure 1E:
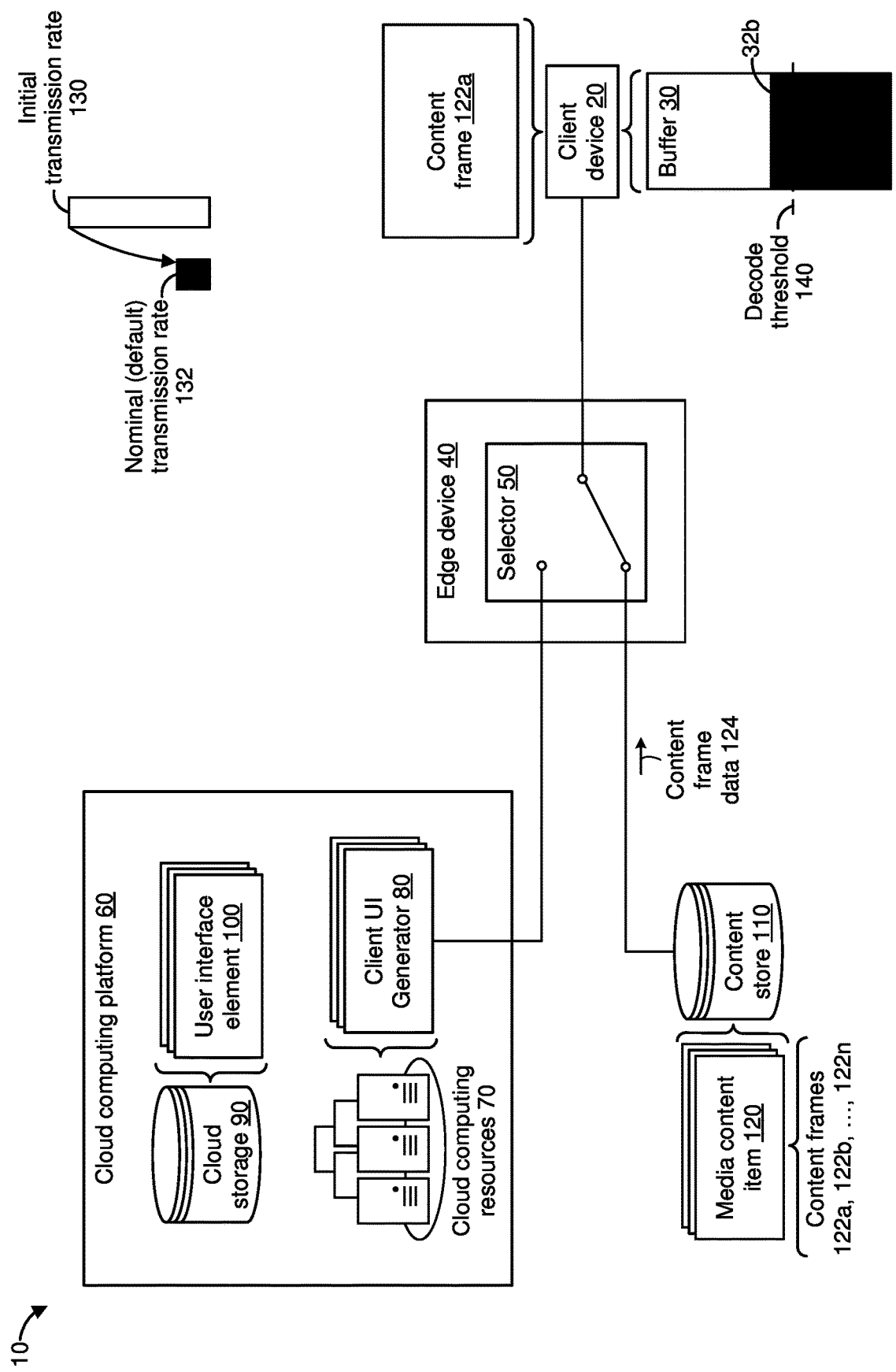

Referring to FIG. 1E, the buffer 30 now stores a second number of bits 32b that is greater than the decode threshold 140. Since the second number of bits 32b is greater than the decode threshold 140, the client device 20 can start decoding the content frame data 124. As shown in FIG. 1E, the client device 20 presents the first content frame 122a after decoding the content frame data 124. When the number of bits stored in the buffer 30 is greater than the decode threshold 140, the edge device 40 can reduce the transmission rate from the initial transmission rate 130 to the nominal transmission rate 132. Reducing the transmission rate once the decode threshold 140 is satisfied makes network resources available to other client devices.

Figure 1F:
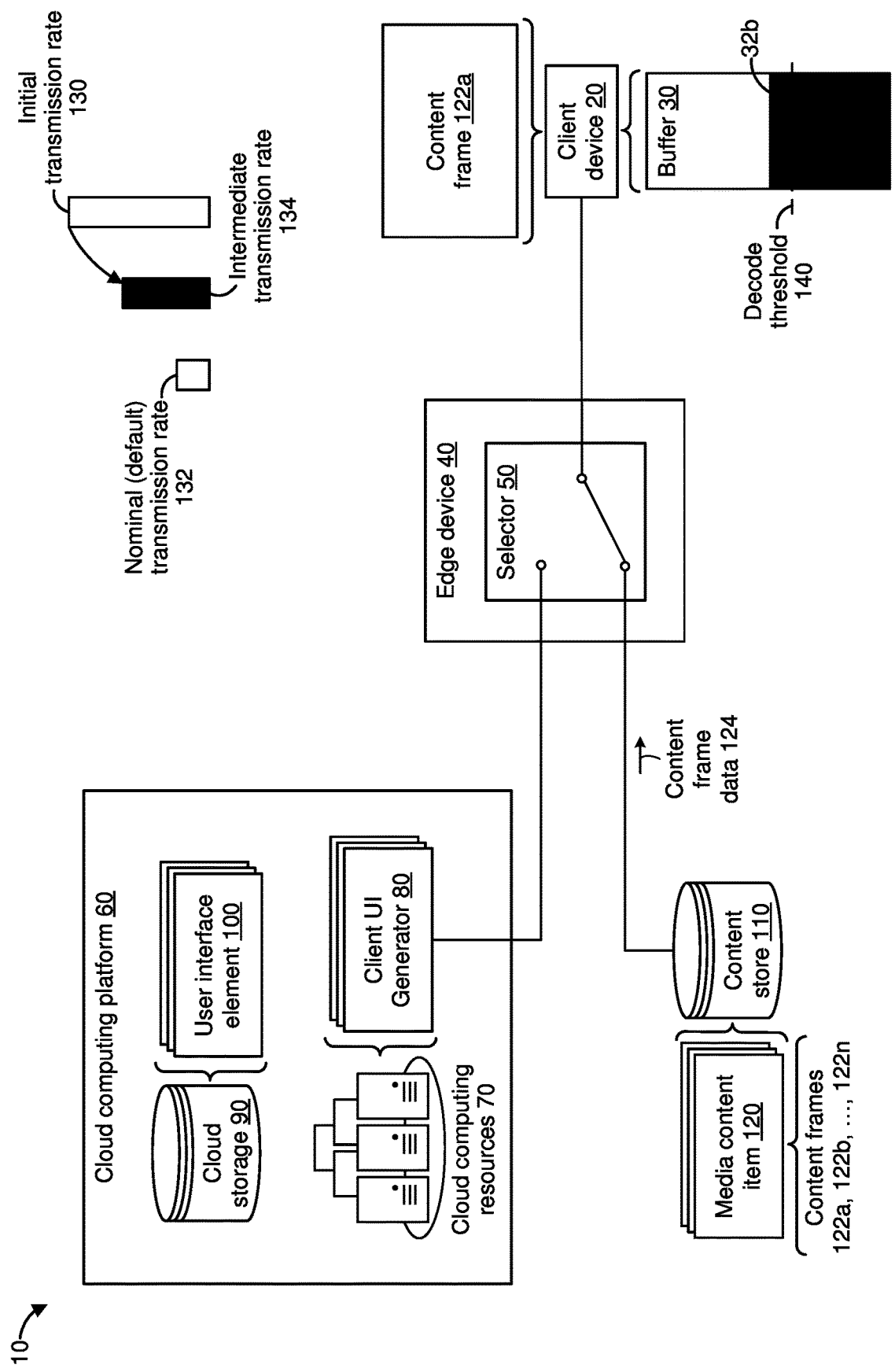

As shown in FIG. 1F, the edge device 40 can reduce the transmission rate gradually. For example, the edge device 40 can reduce the transmission rate to an intermediate transmission rate 134. After transmitting additional content frame data 124 at the intermediate transmission rate 134, the edge device 40 can eventually reduce the transmission rate to the nominal transmission rate 132.

FIG. 2 illustrates a block diagram of a system 200 in accordance with some implementations. In some implementations, the system 200 is implemented by the edge device 40 shown in FIGS. 1A-1F. For example, in some implementations, the system 200 resides at the edge device 40. As shown in FIG. 2, the system 200 can include a data obtainer 210, a decode threshold determiner 220, a transmission rate determiner 240 and a data transmitter 250.

The data obtainer 210 obtains client buffer status 212 for a client device (e.g., the client device 20 shown in FIGS. 1A-1F). The client buffer status 212 indicates a number of bits that are stored in a buffer of the client device. The data obtainer 210 can receive the client buffer status 212 periodically (e.g., every 1-2 seconds). The data obtainer 210 provides the client buffer status 212 to the transmission rate determiner 240. The data obtainer 210 can collect additional data from the client device (e.g., a number of lost/missed frames, a number of network retries, a network bitrate, etc.) that can be used to control the transmission rate.

The decode threshold determiner 220 determines a decode threshold 222 for the client device (e.g., the decode threshold 140 shown in FIGS. 1C-1F). The decode threshold determiner 220 can determine the decode threshold 222 based on a client bandwidth 224. The decode threshold 222 may be inversely proportional to the client bandwidth 224. For example, if the client bandwidth 224 is relatively low, the decode threshold determiner 220 may set the decode threshold 222 to a relatively high value.

The decode threshold determiner 220 can determine the decode threshold 222 based on network congestion 226. The decode threshold 222 may be directly proportional to the network congestion 226. For example, if the network congestion 226 is relatively high, the decode threshold determiner 220 may set the decode threshold 222 to a relatively high value. On a similar vein, if the network congestion 226 is relatively low, the decode threshold determiner 220 may set the decode threshold 222 to a relatively low value.

The decode threshold determiner 220 can determine the decode threshold 222 based on a content type 228 of the content that is being presented at the client device in the buffered content presentation mode. For example, the decode threshold 222 for pre-recorded content (e.g., video on-demand (VOD)) can be set to a higher value than the decode threshold 222 for live content.

The decode threshold determiner 220 may receive the decode threshold 222 from the client device. For example, the client device may specify a minimum number of bits that the client device needs to have in its buffer in order to start decoding. More generally, in various implementations, the decode threshold 222 is based on a characteristic value associated with the client device (e.g., a client bandwidth, a buffer size, etc.), and/or the content that is being presented in the buffered content presentation mode (e.g., a type of the content, a resolution of the content, etc.).

The decode threshold determiner 220 can determine the decode threshold 222 based on additional data provided by the client device. For example, if the client device indicates a number of lost/missed frames, a number of network retries or a network bitrate, the decode threshold determiner 220 can determine the decode threshold 222 based on the number of lost/missed frames, the number of network retries and/or the network bitrate.

The transmission rate determiner 240 determines a transmission rate 242 for transmitting frame data 252 based on the client buffer status 212 and the decode threshold 222. If the client buffer status 212 indicates that a number of bits stored in the buffer is less than the decode threshold 222, the transmission rate determiner 240 selects a transmission rate 242 that is greater than a default transmission rate in order to fill the buffer with enough bits to satisfy the decode threshold 222. By contrast, if the client buffer status 212 indicates that the number of bits stored in the buffer is greater than the decode threshold 222, the transmission rate determiner 240 sets the transmission rate 242 to the default transmission rate. The data transmitter 250 transmits the frame data 252 at the transmission rate 242 determined by the transmission rate determiner 240.

The transmission rate determiner 240 can determine the transmission rate 242 based on additional data provided by the client device. For example, if the client device indicates a number of lost/missed frames, a number of network retries or a network bitrate, the transmission rate determiner 240 can determine the transmission rate 242 based on the number of lost/missed frames, the number of network retries and/or the network bitrate.

Figure 3:
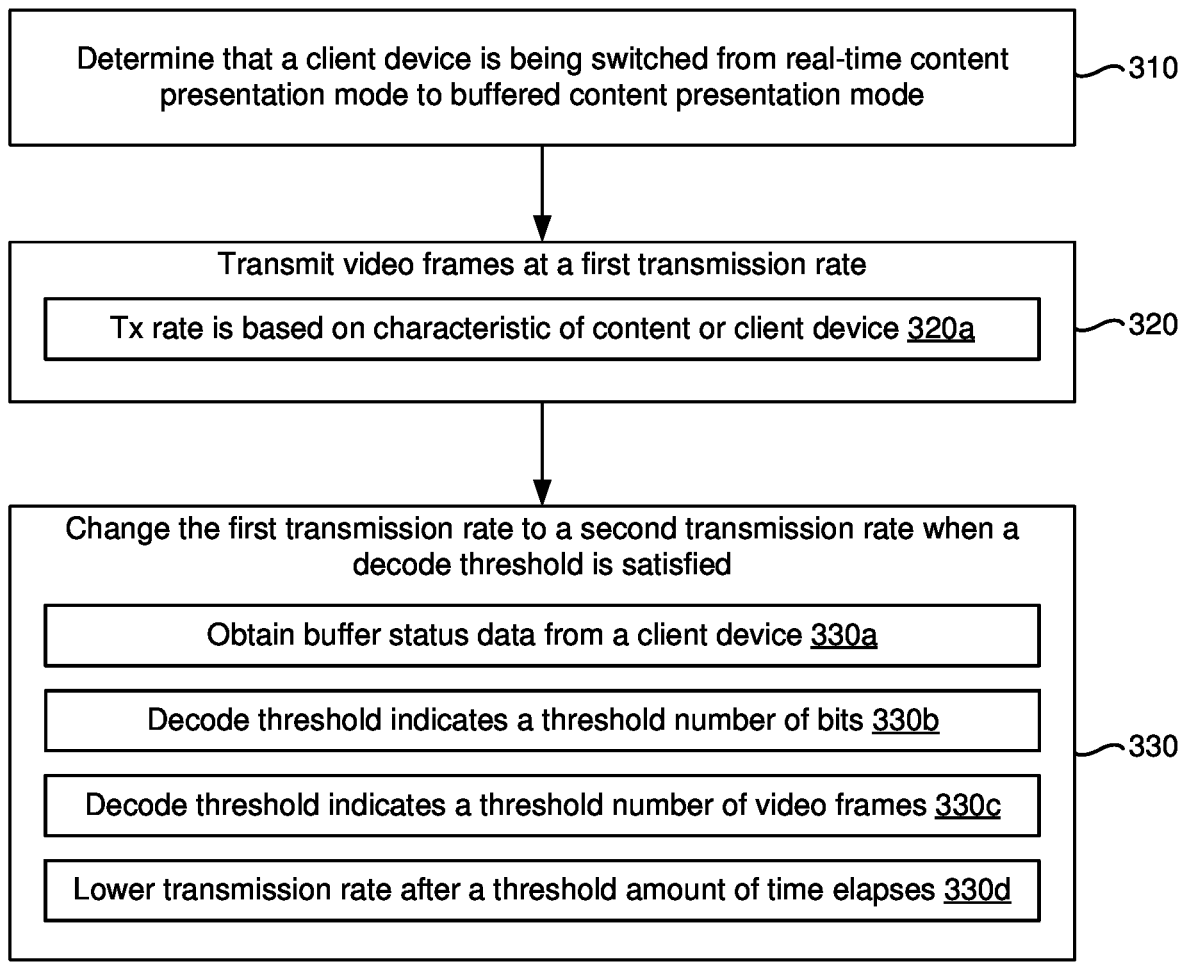
FIG. 3 is a flowchart representation of a method of reducing a decode delay at a client device in accordance with some implementations.

FIG. 3 is a flowchart representation of a method 300 for reducing a decode delay at a client device. In various implementations, the method 300 is performed by a device (e.g., by the edge device 40 shown in FIGS. 1A-1F). In some implementations, the method 300 is performed by processing logic, including hardware, firmware, software, or a combination thereof. In some implementations, the method 300 is performed by a processor executing code stored in a non-transitory computer-readable medium (e.g., a memory).

As represented by block 310, in various implementations, the method 300 includes determining that a client device is being switched from a real-time content presentation mode in which the client device presents real-time content to a buffered content presentation mode in which the client device presents buffered content. For example, as indicated by the arrow 52 in FIG. 1B, the client device 20 is being switched to the buffered content presentation mode.

As represented by block 320, in some implementations, the method 300 includes transmitting, to the client device, video frames corresponding to the buffered content at a first transmission rate. For example, as shown in FIG. 1C, the edge device 40 transmits the content frame data 124 to the client device 20 at the initial transmission rate 130.

As represented by block 320a, in some implementations, the first transmission rate is based on a characteristic value associated with the buffered content or the client device. For example, as explained herein, the initial transmission rate for live content can be higher than the initial transmission rate for pre-recorded content. As another example, the initial transmission rate for a client device with a relatively large buffer can be higher than the initial transmission rate for a client device with a relatively small buffer.

As represented by block 330, in some implementations, the method 300 includes changing the first transmission rate to a second transmission rate based on an indication that a number of bits stored in a buffer of the client device satisfies a decode threshold. For example, as shown in FIG. 1E, the edge device 40 reduces the transmission rate to the nominal transmission rate 132 when the buffer 30 stores enough bits to satisfy the decode threshold 140.

As represented by block 330a, in some implementations, the method 300 includes obtaining, from the client device, buffer status data that indicates the number of bits that are stored in the buffer of the client device. For example, as shown in FIG. 2, the data obtainer 210 obtains the client buffer status 212. As explained herein, in some implementations, the method 300 includes periodically polling the client device for the buffer status data.

As represented by block 330b, in some implementations, the decode threshold indicates a threshold number of bits that the client device requires to start decoding video frames corresponding to the buffered content. For example, as explained in relation to FIG. 1C, the client device 20 requires a number of bits that is greater than the decode threshold 140 in order to start decoding the content frame data 124. In some implementations, changing the first transmission rate to the second transmission rate includes lowering the first transmission rate to the second transmission rate in response to the number of bits stored in the buffer being greater than the threshold number of bits indicated by the decode threshold. For example, as shown in FIG. 1E, the edge device 40 lowers the transmission rate to the nominal transmission rate 132 when the second number of bits 32b is greater than the decode threshold 140.

In some implementations, the threshold number of bits is a function of an amount of network congestion. For example, as explained in relation to FIG. 2, the decode threshold 222 can be directly proportional to the network congestion 226. In some implementations, the threshold number of bits is a function of an amount of bandwidth available to the client device. For example, as explained in relation to FIG. 2, the decode threshold 222 can be inversely proportional to the client bandwidth 224. In some implementations, the threshold number of bits is a function of a type of the buffered content. For example, as explained in relation to FIG. 2, the decode threshold 222 can be based on the content type 228. As an example, the threshold number can be higher for pre-recorded content (e.g., for video on-demand (VOD)) and lower for non-recorded content (e.g., for live content).

In some implementations, the threshold number of bits is a function of a size of the buffer. If the edge device is targeting to fill-up half of the buffer before lowering the transmission rate and the buffer is relatively large, then the edge device may select a higher initial transmission rate in order to fill-up half of the buffer more quickly. By contrast, if the edge device is targeting to fill-up half of the buffer and the buffer is relatively small, then the edge device may select a lower initial transmission rate because a smaller buffer will fill-up relatively quickly even at a lower initial transmission rate.

As represented by block 330c, in some implementations, the decode threshold indicates a threshold number of video frames that the client device requires to start presenting the buffered content. In such implementations, changing the first transmission rate to the second transmission rate includes lowering the first transmission rate to the second transmission rate in response to the number of bits stored in the buffer corresponding to a number of video frames that is greater than the threshold number of video frames.

As represented by block 330d, in some implementations, changing the first transmission rate to the second transmission rate includes determining an amount of time that has elapsed since the client device was switched from the real-time content presentation mode to the buffered content presentation mode. The device maintains the first transmission rate until the amount of time is less than a threshold amount of time. For example, the device maintains the higher initial transmission rate for the first 300 milliseconds. The device lowers the first transmission rate to the second transmission rate when the amount of time is greater than the threshold amount of time. For example, the device switches to the lower transmission rate after 300 milliseconds have elapsed.

Figure 4:
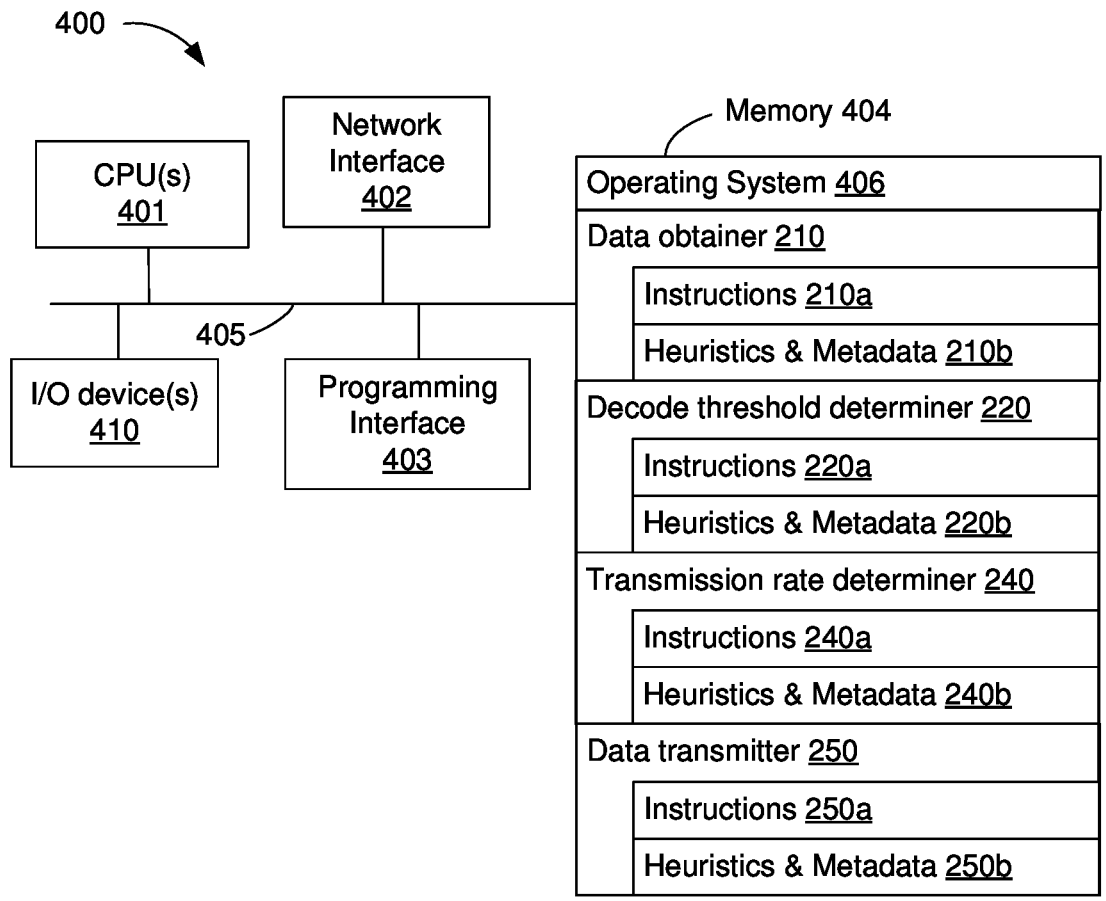
FIG. 4 is a block diagram of a device that reduces a decode delay at a client device in accordance with some implementations.

FIG. 4 is a block diagram of a device 400 in accordance with some implementations. In some implementations, the device 400 implements the edge device 40 shown in FIGS. 1A-1F and/or the system 200 shown in FIG. 2. While certain specific features are illustrated, those of ordinary skill in the art will appreciate from the present disclosure that various other features have not been illustrated for the sake of brevity, and so as not to obscure more pertinent aspects of the implementations disclosed herein. To that end, as a non-limiting example, in some implementations the device 400 includes one or more processing units (CPUs) 401, a network interface 402, a programming interface 403, a memory 404, one or more input/output (I/O) devices 410, and one or more communication buses 405 for interconnecting these and various other components.

In some implementations, the network interface 402 is provided to, among other uses, establish and maintain a metadata tunnel between a cloud hosted network management system and at least one private network including one or more compliant devices. In some implementations, the one or more communication buses 405 include circuitry that interconnects and controls communications between system components. The memory 404 includes high-speed random access memory, such as DRAM, SRAM, DDR RAM or other random access solid state memory devices, and may include non-volatile memory, such as one or more magnetic disk storage devices, optical disk storage devices, flash memory devices, or other non-volatile solid state storage devices. The memory 404 optionally includes one or more storage devices remotely located from the one or more CPUs 401. The memory 404 comprises a non-transitory computer readable storage medium.

In some implementations, the memory 404 or the non-transitory computer readable storage medium of the memory 404 stores the following programs, modules and data structures, or a subset thereof including an optional operating system 406, the data obtainer 210, the decode threshold determiner 220, the transmission rate determiner 240 and the data transmitter 250. In various implementations, the device 400 performs the method 300 shown in FIG. 3.

In some implementations, the data obtainer 210 includes instructions 210a, and heuristics and metadata 210b for obtaining client buffer status and/or user inputs. In some implementations, the data obtainer 210 performs at least some of the operation(s) represented by block 310 in FIG. 3.

In some implementations, the decode threshold determiner 220 includes instructions 220a, and heuristics and metadata 220b for determining a decode threshold for a client device. In some implementations, the decode threshold determiner 220 performs at least some of the operation(s) represented by block 330b in FIG. 3.

In some implementations, the transmission rate determiner 240 includes instructions 240a, and heuristics and metadata 240b for determining a transmission rate for transmitting content frame data to a client device in order to reduce a decode delay at the client device. In some implementations, the transmission rate determiner 240 performs at least some of the operation(s) represented by blocks 320 and 330 in FIG. 3.

In some implementations, the data transmitter 250 includes instructions 250a, and heuristics and metadata 250b for transmitting content frame data to the client device at the transmission rate determined by the transmission rate determiner 240. In some implementations, the data transmitter 250 performs at least some of the operation(s) represented by block 320 in FIG. 3.

In some implementations, the one or more I/O devices 410 include a receiver for receiving buffer status data and a transmitter for transmitting content frame data.

It will be appreciated that FIG. 4 is intended as a functional description of the various features which may be present in a particular implementation as opposed to a structural schematic of the implementations described herein. As recognized by those of ordinary skill in the art, items shown separately could be combined and some items could be separated. For example, some functional blocks shown separately in FIG. 4 could be implemented as a single block, and the various functions of single functional blocks could be implemented by one or more functional blocks in various implementations. The actual number of blocks and the division of particular functions and how features are allocated among them will vary from one implementation to another and, in some implementations, depends in part on the particular combination of hardware, software, and/or firmware chosen for a particular implementation.

While various aspects of implementations within the scope of the appended claims are described above, it should be apparent that the various features of implementations described above may be embodied in a wide variety of forms and that any specific structure and/or function described above is merely illustrative. Based on the present disclosure one skilled in the art should appreciate that an aspect described herein may be implemented independently of any other aspects and that two or more of these aspects may be combined in various ways. For example, an apparatus may be implemented and/or a method may be practiced using any number of the aspects set forth herein. In addition, such an apparatus may be implemented and/or such a method may be practiced using other structure and/or functionality in addition to or other than one or more of the aspects set forth herein.

What is claimed is:

1. A method comprising:
at a device including a non-transitory memory and one or more processors:
transmitting, to a client device, real-time content that is presented by the client device in a real-time content presentation mode without storing the real-time content in a buffer of the client device prior to presenting the real-time content;
while the client device is presenting the real-time content in the real-time content presentation mode, receiving a user input from the client device;
in response to receiving the user input from the client device, switching the client device from the real-time content presentation mode in which the client device presents the real-time content to a buffered content presentation mode in which the client device presents buffered content;
transmitting, to the client device, video frames corresponding to the buffered content at a first transmission rate that is greater than a nominal transmission rate until a number of bits stored in the buffer of the client device is greater than a decode threshold in order to reduce decode delay at the client device; and
reducing the first transmission rate to a second transmission rate based on an indication that the number of bits stored in the buffer of the client device is greater than the decode threshold.

2. The method of claim 1, further comprising obtaining, from the client device, buffer status data that indicates the number of bits that are stored in the buffer of the client device.

3. The method of claim 1, wherein the decode threshold indicates a threshold number of bits that the client device requires to start decoding video frames corresponding to the buffered content; and
wherein reducing the first transmission rate to the second transmission rate comprises lowering the first transmission rate to the second transmission rate in response to the number of bits stored in the buffer being greater than the threshold number of bits indicated by the decode threshold.

4. The method of claim 3, wherein the threshold number of bits is a function of an amount of network congestion.

5. The method of claim 3, wherein the threshold number of bits is a function of an amount of bandwidth available to the client device.

6. The method of claim 3, wherein the threshold number of bits is a function of a type of the buffered content.

7. The method of claim 1, wherein the decode threshold indicates a threshold number of video frames that the client device requires to start presenting the buffered content; and
wherein reducing the first transmission rate to the second transmission rate comprises lowering the first transmission rate to the second transmission rate in response to the number of bits stored in the buffer corresponding to a number of video frames that is greater than the threshold number of video frames.

8. The method of claim 1, wherein reducing the first transmission rate to the second transmission rate comprises:
determining an amount of time that has elapsed since the client device was switched from the real-time content presentation mode to the buffered content presentation mode;
maintaining the first transmission rate until the amount of time is less than a threshold amount of time; and
lowering the first transmission rate to the second transmission rate when the amount of time is greater than the threshold amount of time.

9. The method of claim 1, wherein the first transmission rate is based on a characteristic value associated with the buffered content or the client device.

10. The method of claim 1, wherein the real-time content includes user interface (UI) frames that are generated by a cloud computing platform and the video frames corresponding to the buffered content are retrieved from a content store.

11. A device comprising:
one or more processors;
a non-transitory memory; and
one or more programs stored in the non-transitory memory, which, when executed by the one or more processors, cause the device to:
transmit, to a client device, real-time content that is presented by the client device in a real-time content presentation mode without storing the real-time content in a buffer of the client device prior to presenting the real-time content;
while the client device is presenting the real-time content in the real-time content presentation mode, receive a user input from the client device;
in response to receiving the user input from the client device, switch the client device from the real-time content presentation mode in which the client device presents the real-time content to a buffered content presentation mode in which the client device presents buffered content;
transmit, to the client device, video frames corresponding to the buffered content at a first transmission rate that is greater than a nominal transmission rate until a number of bits stored in the buffer of the client device is greater than a decode threshold in order to reduce decode delay at the client device; and
reduce the first transmission rate to a second transmission rate based on an indication that the number of bits stored in the buffer of the client device is greater than the decode threshold.

12. The device of claim 11, wherein the one or more programs further cause the device to obtain, from the client device, buffer status data that indicates the number of bits that are stored in the buffer of the client device.

13. The device of claim 11, wherein the decode threshold indicates a threshold number of bits that the client device requires to start decoding video frames corresponding to the buffered content; and
wherein reducing the first transmission rate to the second transmission rate comprises lowering the first transmission rate to the second transmission rate in response to the number of bits stored in the buffer being greater than the threshold number of bits indicated by the decode threshold.

14. The device of claim 13, wherein the threshold number of bits is a function of an amount of network congestion.

15. The device of claim 13, wherein the threshold number of bits is a function of an amount of bandwidth available to the client device.

16. The device of claim 13, wherein the threshold number of bits is a function of a type of the buffered content.

17. The device of claim 13, wherein the threshold number of bits is a function of a size of the buffer.

18. The device of claim 11, wherein the decode threshold indicates a threshold number of video frames that the client device requires to start presenting the buffered content; and
wherein reducing the first transmission rate to the second transmission rate comprises lowering the first transmission rate to the second transmission rate in response to the number of bits stored in the buffer corresponding to a number of video frames that is greater than the threshold number of video frames.

19. The device of claim 11, wherein reducing the first transmission rate to the second transmission rate comprises:
determining an amount of time that has elapsed since the client device was switched from the real-time content presentation mode to the buffered content presentation mode;
maintaining the first transmission rate until the amount of time is less than a threshold amount of time; and
lowering the first transmission rate to the second transmission rate when the amount of time is greater than the threshold amount of time.

20. A non-transitory memory storing one or more programs, which, when executed by one or more processors of a device, cause the device to:
transmit, to a client device, real-time content that is presented by the client device in a real-time content presentation mode without storing the real-time content in a buffer of the client device prior to presenting the real-time content;
while the client device is presenting the real-time content in the real-time content presentation mode, receive a user input from the client device;
in response to receiving the user input from the client device, switch the client device from the real-time content presentation mode in which the client device presents the real-time content to a buffered content presentation mode in which the client device presents buffered content;
transmit, to the client device, video frames corresponding to the buffered content at a first transmission rate that is greater than a nominal transmission rate until a number of bits stored in the buffer of the client device is greater than a decode threshold in order to reduce decode delay at the client device; and
reduce the first transmission rate to a second transmission rate based on an indication that the number of bits stored in the buffer of the client device is greater than the decode threshold.

* * * * *